United States Patent
Reed

(10) Patent No.: US 9,572,230 B2
(45) Date of Patent: Feb. 14, 2017

(54) CENTRALIZED CONTROL OF AREA LIGHTING HOURS OF ILLUMINATION

(71) Applicant: Express Imaging Systems, LLC, Renton, WA (US)

(72) Inventor: William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 14/869,511

(22) Filed: Sep. 29, 2015

(65) Prior Publication Data

US 2016/0095186 A1  Mar. 31, 2016

Related U.S. Application Data

(60) Provisional application No. 62/057,419, filed on Sep. 30, 2014.

(51) Int. Cl.
*H05B 37/02* (2006.01)

(52) U.S. Cl.
CPC ...... *H05B 37/0218* (2013.01); *H05B 37/0263* (2013.01); *H05B 37/0272* (2013.01); *H05B 37/0281* (2013.01)

(58) Field of Classification Search
None
See application file for complete search history.

(56) References Cited

U.S. PATENT DOCUMENTS

| | | | |
|---|---|---|---|
| 2,745,055 A | 5/1956 | Woerdemann | |
| 4,153,927 A | 5/1979 | Owens | |
| 4,237,377 A | 12/1980 | Sansum | |
| 4,663,521 A | 5/1987 | Maile | |
| 4,811,176 A | 3/1989 | Myhres | |
| 5,086,379 A | 2/1992 | Denison et al. | |
| 5,150,009 A | 9/1992 | Kling et al. | |

(Continued)

FOREIGN PATENT DOCUMENTS

| | | |
|---|---|---|
| DE | 40 01 980 A1 | 8/1990 |
| DE | 19810827 A1 | 9/1999 |

(Continued)

OTHER PUBLICATIONS

"A Review of the Literature on Light Flicker: Ergonomics, Biological Attributes, Potential Health Effects, and Methods in Which Some LED Lighting May Introduce Flicker," IEEE Standard P1789, Feb. 26, 2010, 26 pages.

(Continued)

*Primary Examiner* — Crystal L Hammond
(74) *Attorney, Agent, or Firm* — Seed IP Law Group LLP

(57) ABSTRACT

Systems, methods and articles for providing centralized control of area lighting hours of illumination. An illumination system includes a central control system operatively coupled to a plurality of luminaires through a power-line power distribution system. The central control system issues illumination commands to the plurality of luminaires through the power-line power distribution system. The central control system may generate commands directed to all luminaires in an illumination system, or to one or more subsets of luminaires in the lamination system. The central control system may sequentially turn on luminaires in the illumination system to reduce power surges that would otherwise occur.

27 Claims, 5 Drawing Sheets

(56) References Cited

U.S. PATENT DOCUMENTS

| | | |
|---|---|---|
| 5,160,202 A | 11/1992 | Légaré |
| 5,161,107 A | 11/1992 | Mayeaux et al. |
| 5,230,556 A | 7/1993 | Canty et al. |
| 5,274,350 A | 12/1993 | Larson |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,936,362 A | 8/1999 | Alt et al. |
| 5,948,829 A | 9/1999 | Wallajapet et al. |
| 6,094,919 A | 8/2000 | Bhatia |
| 6,111,739 A | 8/2000 | Wu et al. |
| 6,149,283 A | 11/2000 | Conway et al. |
| 6,160,353 A | 12/2000 | Mancuso |
| 6,230,497 B1 | 5/2001 | Morris et al. |
| D447,266 S | 8/2001 | Verfuerth |
| 6,377,191 B1 | 4/2002 | Takubo |
| 6,400,101 B1 | 6/2002 | Biebl et al. |
| D460,735 S | 7/2002 | Verfuerth |
| D463,059 S | 9/2002 | Verfuerth |
| 6,499,860 B2 | 12/2002 | Begemann |
| 6,585,396 B1 | 7/2003 | Verfuerth |
| 6,601,972 B2 | 8/2003 | Sei et al. |
| D479,826 S | 9/2003 | Verfuerth et al. |
| 6,612,720 B1 | 9/2003 | Beadle |
| D483,332 S | 12/2003 | Verfuerth |
| 6,674,060 B2 | 1/2004 | Antila |
| 6,753,842 B1 | 6/2004 | Williams et al. |
| 6,758,580 B1 | 7/2004 | Verfuerth |
| 6,787,999 B2 | 9/2004 | Stimac et al. |
| 6,828,911 B2 | 12/2004 | Jones et al. |
| 6,841,947 B2 | 1/2005 | Berg-johansen |
| 6,847,156 B2 | 1/2005 | Kim |
| 6,885,134 B2 | 4/2005 | Kurashima et al. |
| 6,902,292 B2 | 6/2005 | Lai |
| 6,948,829 B2 | 9/2005 | Verdes et al. |
| 6,964,501 B2 | 11/2005 | Ryan |
| 6,964,502 B1 | 11/2005 | Verfuerth |
| 7,019,276 B2 | 3/2006 | Cloutier et al. |
| 7,066,622 B2 | 6/2006 | Alessio |
| 7,081,722 B1 | 7/2006 | Huynh et al. |
| 7,111,961 B2 | 9/2006 | Trenchard et al. |
| 7,122,976 B1 | 10/2006 | Null et al. |
| 7,144,140 B2 | 12/2006 | Sun et al. |
| 7,145,179 B2 | 12/2006 | Petroski |
| 7,165,866 B2 | 1/2007 | Li |
| D538,462 S | 3/2007 | Verfuerth et al. |
| 7,188,967 B2 | 3/2007 | Dalton et al. |
| 7,196,477 B2 | 3/2007 | Richmond |
| 7,213,940 B1 | 5/2007 | Van De Ven et al. |
| 7,218,056 B1 * | 5/2007 | Harwood ............... G08B 7/066 307/66 |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| D557,817 S | 12/2007 | Verfuerth |
| D560,469 S | 1/2008 | Bartol et al. |
| 7,314,261 B2 | 1/2008 | Jackson Pulver et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,002 B2 | 2/2008 | Joung |
| 7,330,568 B2 | 2/2008 | Nagaoka et al. |
| 7,339,323 B2 | 3/2008 | Bucur |
| 7,339,471 B1 | 3/2008 | Chan et al. |
| 7,341,362 B2 | 3/2008 | Bjornson et al. |
| 7,387,403 B2 | 6/2008 | Mighetto |
| 7,401,942 B1 | 7/2008 | Verfuerth et al. |
| 7,405,524 B2 | 7/2008 | Null et al. |
| 7,438,440 B2 | 10/2008 | Dorogi |
| 7,440,280 B2 | 10/2008 | Shuy |
| 7,458,330 B2 | 12/2008 | MacDonald et al. |
| 7,461,964 B1 | 12/2008 | Aubrey |
| 7,468,723 B1 | 12/2008 | Collins |
| 7,475,002 B1 | 1/2009 | Mann |
| 7,524,089 B2 | 4/2009 | Park |
| 7,538,499 B2 | 5/2009 | Ashdown |
| 7,549,773 B2 | 6/2009 | Lim |
| D595,894 S | 7/2009 | Verfuerth et al. |
| 7,556,406 B2 | 7/2009 | Petroski et al. |
| 7,559,674 B2 | 7/2009 | He et al. |
| 7,563,006 B1 | 7/2009 | Verfuerth et al. |
| 7,564,198 B2 | 7/2009 | Yamamoto et al. |
| 7,569,802 B1 | 8/2009 | Mullins |
| 7,575,338 B1 | 8/2009 | Verfuerth |
| 7,578,596 B2 | 8/2009 | Martin |
| 7,578,597 B2 | 8/2009 | Hoover et al. |
| 7,581,856 B2 | 9/2009 | Kang et al. |
| 7,595,595 B2 | 9/2009 | Mehta |
| D606,697 S | 12/2009 | Verfuerth et al. |
| D606,698 S | 12/2009 | Verfuerth et al. |
| 7,626,342 B2 | 12/2009 | Sun et al. |
| 7,627,372 B2 | 12/2009 | Vaisnys et al. |
| 7,628,506 B2 | 12/2009 | Verfuerth et al. |
| 7,631,324 B2 | 12/2009 | Buonasera et al. |
| 7,633,463 B2 | 12/2009 | Negru |
| 7,635,203 B2 | 12/2009 | Weaver, Jr. et al. |
| 7,637,633 B2 | 12/2009 | Wong |
| 7,665,862 B2 | 2/2010 | Villard |
| 7,677,753 B1 | 3/2010 | Wills |
| 7,686,461 B2 | 3/2010 | Goray et al. |
| 7,688,002 B2 | 3/2010 | Ashdown et al. |
| 7,688,222 B2 | 3/2010 | Peddie et al. |
| 7,695,160 B2 | 4/2010 | Hirata et al. |
| 7,697,925 B1 * | 4/2010 | Wilson .................. H04M 1/22 455/418 |
| 7,703,951 B2 | 4/2010 | Piepgras et al. |
| D617,028 S | 6/2010 | Verfuerth et al. |
| D617,029 S | 6/2010 | Verfuerth et al. |
| 7,748,879 B2 | 7/2010 | Koike et al. |
| 7,762,861 B2 | 7/2010 | Verfuerth et al. |
| 7,766,507 B2 | 8/2010 | Nakajima |
| 7,766,508 B2 | 8/2010 | Villard et al. |
| 7,780,310 B2 | 8/2010 | Verfuerth et al. |
| 7,780,314 B2 | 8/2010 | Seabrook |
| D623,340 S | 9/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,857,497 B2 | 12/2010 | Koike et al. |
| 7,874,699 B2 | 1/2011 | Liang |
| 7,874,710 B2 | 1/2011 | Tsai et al. |
| D632,006 S | 2/2011 | Verfuerth et al. |
| 7,901,107 B2 | 3/2011 | Van De Ven et al. |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,976,182 B2 | 7/2011 | Ribarich |
| 7,985,005 B2 | 7/2011 | Alexander et al. |
| 8,018,135 B2 | 9/2011 | Van De Ven et al. |
| 8,057,070 B2 | 11/2011 | Negley et al. |
| 8,066,410 B2 | 11/2011 | Booth et al. |
| D650,225 S | 12/2011 | Bartol et al. |
| 8,070,312 B2 | 12/2011 | Verfuerth et al. |
| 8,100,552 B2 | 1/2012 | Spero |
| 8,118,450 B2 | 2/2012 | Villard |
| 8,118,456 B2 | 2/2012 | Reed et al. |
| 8,136,958 B2 | 3/2012 | Verfuerth et al. |
| 8,143,769 B2 | 3/2012 | Li |
| 8,174,212 B2 | 5/2012 | Tziony et al. |
| 8,186,855 B2 | 5/2012 | Wassel et al. |
| RE43,456 E | 6/2012 | Verfuerth et al. |
| 8,207,830 B2 | 6/2012 | Rutjes et al. |
| 8,254,137 B2 | 8/2012 | Wilkolaski et al. |
| 8,260,575 B2 | 9/2012 | Walters et al. |
| 8,290,710 B2 | 10/2012 | Cleland et al. |

(56) References Cited

U.S. PATENT DOCUMENTS

| | | |
|---|---|---|
| 8,302,677 B2 | 11/2012 | Havinga |
| 8,324,641 B2 | 12/2012 | Yan et al. |
| 8,334,640 B2 | 12/2012 | Reed et al. |
| 8,337,043 B2 | 12/2012 | Verfuerth et al. |
| 8,362,677 B1 | 1/2013 | Morejon et al. |
| 8,376,583 B2 | 2/2013 | Wang et al. |
| 8,378,563 B2 | 2/2013 | Reed et al. |
| 8,390,475 B2 | 3/2013 | Feroldi |
| 8,408,739 B2 | 4/2013 | Villard et al. |
| 8,427,076 B2 | 4/2013 | Bourquin et al. |
| 8,450,670 B2 | 5/2013 | Verfuerth et al. |
| 8,508,137 B2 | 8/2013 | Reed |
| 8,547,022 B2 | 10/2013 | Summerford et al. |
| 8,637,877 B2 | 1/2014 | Negley |
| 8,646,944 B2 | 2/2014 | Villard |
| 8,674,608 B2 | 3/2014 | Holland et al. |
| 8,749,403 B2 | 6/2014 | King et al. |
| 8,794,804 B2 | 8/2014 | Verfuerth et al. |
| 8,810,138 B2 | 8/2014 | Reed |
| 8,816,576 B1 | 8/2014 | Erion et al. |
| 8,858,019 B2 | 10/2014 | Novak et al. |
| 8,872,964 B2 | 10/2014 | Reed et al. |
| 8,878,440 B2 | 11/2014 | Reed |
| 8,896,215 B2 | 11/2014 | Reed et al. |
| 8,901,825 B2 | 12/2014 | Reed |
| 8,922,124 B2 | 12/2014 | Reed et al. |
| 8,926,138 B2 | 1/2015 | Reed et al. |
| 8,926,139 B2 | 1/2015 | Reed et al. |
| 8,987,992 B2 | 3/2015 | Reed |
| 9,119,270 B2 | 8/2015 | Chen et al. |
| 9,210,751 B2 | 12/2015 | Reed |
| 9,210,759 B2 | 12/2015 | Reed |
| 9,312,451 B2 | 4/2016 | Reed et al. |
| 2003/0016143 A1 | 1/2003 | Ghazarian |
| 2003/0123521 A1 | 7/2003 | Luoma |
| 2003/0184672 A1 | 10/2003 | Wu et al. |
| 2004/0120156 A1 | 6/2004 | Ryan |
| 2004/0192227 A1 | 9/2004 | Beach et al. |
| 2005/0057187 A1 | 3/2005 | Catalano |
| 2005/0146884 A1 | 7/2005 | Scheithauer |
| 2005/0231133 A1 | 10/2005 | Lys |
| 2005/0265019 A1 | 12/2005 | Sommers et al. |
| 2006/0014118 A1 | 1/2006 | Utama |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2007/0032990 A1 | 2/2007 | Williams et al. |
| 2007/0102033 A1 | 5/2007 | Petrocy |
| 2007/0139961 A1 | 6/2007 | Cheah et al. |
| 2007/0147046 A1 | 6/2007 | Arik et al. |
| 2007/0153550 A1 | 7/2007 | Lehman et al. |
| 2007/0183156 A1 | 8/2007 | Shan |
| 2007/0225933 A1 | 9/2007 | Shimomura |
| 2007/0285000 A1 | 12/2007 | Lim et al. |
| 2007/0297184 A1 | 12/2007 | Isely |
| 2008/0018261 A1 | 1/2008 | Kastner |
| 2008/0043106 A1 | 2/2008 | Hassapis et al. |
| 2008/0106907 A1 | 5/2008 | Trott et al. |
| 2008/0130304 A1 | 6/2008 | Rash et al. |
| 2008/0205068 A1 | 8/2008 | Neeld et al. |
| 2008/0232116 A1 | 9/2008 | Kim |
| 2008/0266839 A1 | 10/2008 | Claypool et al. |
| 2008/0298058 A1 | 12/2008 | Kan et al. |
| 2009/0000217 A1 | 1/2009 | Verfuerth et al. |
| 2009/0001372 A1 | 1/2009 | Arik et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0225540 A1 | 9/2009 | Chen |
| 2009/0230883 A1 | 9/2009 | Haug |
| 2009/0235208 A1 | 9/2009 | Nakayama et al. |
| 2009/0244899 A1 | 10/2009 | Chyn |
| 2009/0261735 A1 | 10/2009 | Sibalich et al. |
| 2009/0273290 A1 | 11/2009 | Ziegenfuss |
| 2009/0278479 A1 | 11/2009 | Platner et al. |
| 2010/0001652 A1 | 1/2010 | Damsleth |
| 2010/0052557 A1 | 3/2010 | Van Der Veen et al. |
| 2010/0053962 A1 | 3/2010 | Mo et al. |
| 2010/0084979 A1 | 4/2010 | Burton et al. |
| 2010/0123403 A1 | 5/2010 | Reed |
| 2010/0149822 A1 | 6/2010 | Cogliano et al. |
| 2010/0171442 A1 | 7/2010 | Draper et al. |
| 2010/0177519 A1 | 7/2010 | Schlitz |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0271802 A1 | 10/2010 | Recker et al. |
| 2010/0277914 A1 | 11/2010 | Bachl et al. |
| 2010/0277917 A1 | 11/2010 | Shan |
| 2010/0290236 A1 | 11/2010 | Gingrich, III et al. |
| 2010/0309310 A1 | 12/2010 | Albright |
| 2010/0328946 A1 | 12/2010 | Borkar et al. |
| 2010/0328947 A1 | 12/2010 | Chang et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0084614 A1* | 4/2011 | Eisele ................ H05B 33/0857 315/152 |
| 2011/0090686 A1 | 4/2011 | Pickard |
| 2011/0176297 A1 | 7/2011 | Hsia et al. |
| 2011/0221346 A1 | 9/2011 | Lee et al. |
| 2011/0235317 A1 | 9/2011 | Verfuerth et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0081906 A1 | 4/2012 | Verfuerth et al. |
| 2012/0146518 A1 | 6/2012 | Keating et al. |
| 2012/0153854 A1 | 6/2012 | Setomoto et al. |
| 2012/0169053 A1 | 7/2012 | Tchoryk, Jr. et al. |
| 2012/0181935 A1 | 7/2012 | Velazquez |
| 2012/0212138 A1* | 8/2012 | Jungwirth .......... H05B 33/0824 315/122 |
| 2012/0221154 A1 | 8/2012 | Runge |
| 2012/0224363 A1 | 9/2012 | Van De Ven |
| 2012/0242254 A1 | 9/2012 | Kim et al. |
| 2012/0286673 A1* | 11/2012 | Holland ............. H05B 33/0854 315/155 |
| 2012/0286770 A1 | 11/2012 | Schröder et al. |
| 2013/0057158 A1 | 3/2013 | Josefowicz et al. |
| 2013/0126715 A1 | 5/2013 | Flaherty |
| 2013/0141000 A1 | 6/2013 | Wei et al. |
| 2013/0163243 A1 | 6/2013 | Reed |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0293112 A1 | 11/2013 | Reed et al. |
| 2013/0308325 A1 | 11/2013 | Verfuerth et al. |
| 2013/0340353 A1 | 12/2013 | Whiting et al. |
| 2014/0001961 A1 | 1/2014 | Anderson et al. |
| 2014/0015418 A1* | 1/2014 | Pandharipande .. H05B 37/0218 315/152 |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0140052 A1 | 5/2014 | Villard |
| 2014/0159585 A1 | 6/2014 | Reed |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0313719 A1 | 10/2014 | Wang et al. |
| 2014/0339390 A1 | 11/2014 | Verfuerth et al. |
| 2015/0015716 A1 | 1/2015 | Reed et al. |
| 2015/0028770 A1 | 1/2015 | Verfuerth et al. |
| 2015/0069920 A1 | 3/2015 | Denteneer et al. |
| 2015/0077019 A1 | 3/2015 | Reed et al. |

(56) References Cited

U.S. PATENT DOCUMENTS

| | | | |
|---|---|---|---|
| 2015/0078005 | A1 | 3/2015 | Renn et al. |
| 2015/0084520 | A1 | 3/2015 | Reed |
| 2015/0137693 | A1 | 5/2015 | Reed |

FOREIGN PATENT DOCUMENTS

| | | | |
|---|---|---|---|
| EP | 1 734 795 | A1 | 12/2006 |
| EP | 2 320 713 | A2 | 5/2011 |
| EP | 2 559 937 | A1 | 2/2013 |
| EP | 2 629 491 | A1 | 8/2013 |
| EP | 1 459 600 | B1 | 2/2014 |
| EP | 2 781 138 | A1 | 9/2014 |
| FR | 2 883 306 | A1 | 9/2006 |
| JP | 6-335241 | A | 12/1994 |
| JP | 2001-333420 | A | 11/2001 |
| JP | 2004-279668 | A | 10/2004 |
| JP | 2004-320024 | A | 11/2004 |
| JP | 2004-359065 | A | 12/2004 |
| JP | 2005-93171 | A | 4/2005 |
| JP | 2005-198238 | A | 7/2005 |
| JP | 2005-310997 | A | 2/2006 |
| JP | 2006-031977 | A | 2/2006 |
| JP | 2006-179672 | A | 7/2006 |
| JP | 2006-244711 | A | 9/2006 |
| JP | 2008-59811 | A | 3/2008 |
| JP | 2008-509538 | A | 3/2008 |
| JP | 2008-130523 | A | 6/2008 |
| JP | 2008-159483 | A | 7/2008 |
| JP | 2008-177144 | A | 7/2008 |
| JP | 2008-535279 | A | 8/2008 |
| JP | 2010-504628 | A | 2/2010 |
| KR | 10-2005-0078403 | A | 8/2005 |
| KR | 10-2006-0086254 | A | 7/2006 |
| KR | 20080094344 | A | 10/2008 |
| KR | 10-2009/0042400 | A | 4/2009 |
| KR | 10-0935736 | B1 | 1/2010 |
| KR | 20-2010-0007230 | U | 7/2010 |
| KR | 10-1001276 | B1 | 12/2010 |
| KR | 10-1044224 | B1 | 6/2011 |
| KR | 10-1150876 | B1 | 5/2012 |
| KR | 10-2012-0108662 | A | 10/2012 |
| WO | 02/076068 | A1 | 9/2002 |
| WO | 03/056882 | A1 | 7/2003 |
| WO | 2005/003625 | A1 | 1/2005 |
| WO | 2006/057866 | A2 | 6/2006 |
| WO | 2007/023454 | A1 | 3/2007 |
| WO | 2007/036873 | A2 | 4/2007 |
| WO | 2008/030450 | A2 | 3/2008 |
| WO | 2008/034242 | A1 | 3/2008 |
| WO | 2009/040703 | A2 | 4/2009 |
| WO | 2009/105168 | A2 | 8/2009 |
| WO | 2011/005441 | A2 | 1/2011 |
| WO | 2011/019806 | A2 | 2/2011 |
| WO | 2011/063302 | A2 | 5/2011 |
| WO | 2011/129309 | A1 | 10/2011 |
| WO | 2012/006710 | A1 | 1/2012 |
| WO | 2012/033750 | A1 | 3/2012 |
| WO | 2012/142115 | A | 10/2012 |
| WO | 2013/074900 | A1 | 5/2013 |
| WO | 2014/018773 | A1 | 1/2014 |
| WO | 2014/039683 | A1 | 3/2014 |
| WO | 2014/078854 | A1 | 5/2014 |
| WO | 2015/039120 | A1 | 3/2015 |

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

EE Herald, "Devices to protect High brightness LED from ESD," dated Mar. 16, 2009, retrieved Jun. 10, 2011, retrieved from http://www.eeherald.com/section/new-products/np100779.html, 1 page.

Extended European Search Report, dated Sep. 28, 2015, for corresponding European Application No. 12850159.0-1802, 6 pages.

Extended European Search Report dated Oct. 21, 2015, for corresponding EP Application No. 13835001.2-1802, 7 pages.

Extended European Search Report dated Jan. 4, 2016, for corresponding EP Application No. 13823055.2-1802, 7 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an Llc Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.

International Search Report, mailed Jun. 10, 2009, for PCT/US2009/043170, 4 pages.

International Search Report, mailed Nov. 29, 2010, for PCT/US2010/033000, 3 pages.

International Search Report, mailed Dec. 15, 2010 for PCT/US2010/035658, 3 pages.

International Search Report, mailed Sep. 29, 2011, for PCT/US2011/041402, 3 pages.

International Search Report, mailed Sep. 30, 2011, for PCT/US2011/021359, 3 pages.

International Search Report, mailed Feb. 27, 2013, for PCT/US2012/065476, 3 pages.

International Search Report, mailed Nov. 19, 2013 for PCT/US2013/052092, 4 pages.

International Search Report, mailed Dec. 30, 2013, for PCT/US2013/058266, 3 pages.

International Search Report, mailed Feb. 26, 2014, for PCT/US2013/070794, 3 pages.

International Search Report, mailed Dec. 30, 2014, for PCT/US2014/055909, 3 pages.

International Search Report and Written Opinion, mailed Jan. 13, 2016, for PCT/US2015/053009, 15 pages.

Kadirvel et al., "Self-Powered, Ambient Light Sensor Using bq25504," Texas Instruments, Application Report, SLUA629—Jan. 2012, 6 pages.

Reed et al., "Adjustable Output Solid-State Lamp With Security Features," Office Action mailed Feb. 27, 2014, for U.S. Appl. No. 13/679,687, 11 pages.

Reed et al., "Adjustable Output Solid-State Lamp With Security Features," Amendment filed Jun. 24, 2014, for U.S. Appl. No. 13/679,687, 11 pages.

Reed et al., "Adjustable Output Solid-State Lamp With Security Features," Notice of Allowance mailed Aug. 29, 2014, for U.S. Appl. No. 13/679,687, 9 pages.

Reed et al., "Apparatus and Method for Schedule Based Operation of a Luminaire," Office Action mailed Mar. 26, 2014, for U.S. Appl. No. 13/604,327, 10 pages.

Reed et al., "Apparatus and Method for Schedule Based Operation of a Luminaire," Amendment filed Jun. 24, 2014, for U.S. Appl. No. 13/604,327, 14 pages.

Reed et al., "Apparatus and Method for Schedule Based Operation of a Luminaire," Notice of Allowance mailed Jul. 7, 2014, for U.S. Appl. No. 13/604,327, 8 pages.

Reed et al., "Apparatus and Method for Schedule Based Operations of a Luminaire," Office Action mailed Mar. 2, 2015, for U.S. Appl. No. 14/552,274, 7 pages.

Reed et al., "Apparatus and Method for Schedule Based Operation of a Luminaire" Amendment filed Jun. 1, 2015, for U.S. Appl. No. 14/552,274, 14 pages.

Reed et al., "Apparatus and Method for Schedule Based Operation of a Luminaire" Notice of Allowance mailed Jun. 19, 2015, for U.S. Appl. No. 14/552,274, 9 pages.

Reed et al., "Apparatus and Method of Operating a Luminaire," Office Action mailed Dec. 22, 2014, for U.S. Appl. No. 13/558,191, 17 pages.

(56) References Cited

OTHER PUBLICATIONS

Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Notice of Allowance mailed Apr. 27, 2015, for U.S. Appl. No. 13/558,191, 8 pages.
Reed et al., "Electrically Isolated Heat Sink for Solid-State Light," Office Action mailed Oct. 12, 2012, for U.S. Appl. No. 12/846,516, 11 pages.
Reed et al., "Electrically Isolated Heat Sink for Solid-State Light," Amendment filed Jan. 14, 2013, for U.S. Appl. No. 12/846,516, 16 pages.
Reed et al., "Electrically Isolated Heat Sink for Solid-State Light," Office Action mailed Apr. 4, 2013, for U.S. Appl. No. 12/846,516, 12 pages.
Reed et al., "Gas-Discharge Lamp Replacement," Office Action mailed Jun. 22, 2011, for U.S. Appl. No. 12/437,467, 12 pages.
Reed et al., "Gas-Discharge Lamp Replacement," Amendment filed Sep. 6, 2011, for U.S. Appl. No. 12/437,467, 14 pages.
Reed et al., "Gas-Discharge Lamp Replacement," Office Action mailed Nov. 17, 2011, for U.S. Appl. No. 12/437,467, 15 pages.
Reed et al., "Gas-Discharge Lamp Replacement," Amendment filed Apr. 10, 2012, for U.S. Appl. No. 12/437,467, 22 pages.
Reed et al., "Gas-Discharge Lamp Replacement," Office Action mailed Jun. 12, 2012, for U.S. Appl. No. 12/437,467, 17 pages.
Reed et al., "Gas-Discharge Lamp Replacement," Amendment filed Sep. 7, 2012, for U.S. Appl. No. 12/437,467, 9 pages.
Reed et al., "Gas-Discharge Lamp Replacement," Office Action mailed Jan. 17, 2013, for U.S. Appl. No. 12/437,467, 12 pages.
Reed et al., "Gas-Discharge Lamp Replacement," Office Action mailed Jun. 26, 2013, for U.S. Appl. No. 12/437,467, 15 pages.
Reed et al., "Gas-Discharge Lamp Replacement," Amendment filed Sep. 26, 2013, for U.S. Appl. No. 12/437,467, 20 pages.
Reed et al., "Gas-Discharge Lamp Replacement," Office Action mailed Jan. 30, 2014, for U.S. Appl. No. 12/437,467, 17 pages.
Reed et al., "Gas-Discharge Lamp Replacement," Amendment filed Jul. 30, 2014, for U.S. Appl. No. 12/437,467, 14 pages.
Reed et al., "Gas-Discharge Lamp Replacement," Notice of Allowance mailed Sep. 3, 2014, for U.S. Appl. No. 12/437,467, 8 pages.
Reed et al., "Gas-Discharge Lamp Replacement With Passive Cooling," Office Action mailed Jul. 31, 2012, for U.S. Appl. No. 12/769,956, 15 pages.
Reed et al., "Gas-Discharge Lamp Replacement With Passive Cooling," Amendment filed Oct. 30, 2012, for U.S. Appl. No. 12/769,956, 12 pages.
Reed et al., "Gas-Discharge Lamp Replacement With Passive Cooling," Office Action mailed Nov. 26, 2012, for U.S. Appl. No. 12/769,956, 18 pages.
Reed et al., "Gas-Discharge Lamp Replacement With Passive Cooling," Amendment filed Mar. 25, 2013, for U.S. Appl. No. 12/769,956, 13 pages.
Reed et al., "Gas-Discharge Lamp Replacement With Passive Cooling," Office Action mailed Apr. 26, 2013, for U.S. Appl. No. 12/769,956, 20 pages.
Reed et al., "Gas-Discharge Lamp Replacement With Passive Cooling," Amendment filed Jul. 25, 2013, for U.S. Appl. No. 12/769,956, 12 pages.
Reed et al., "Gas-Discharge Lamp Replacement With Passive Cooling," Office Action mailed Aug. 28, 2013, for U.S. Appl. No. 12/769,956, 22 pages.
Reed et al., "Gas-Discharge Lamp Replacement With Passive Cooling," Amendment filed Nov. 27, 2013, for U.S. Appl. No. 12/769,956, 19 pages.
Reed et al., "Gas-Discharge Lamp Replacement With Passive Cooling," Office Action mailed Dec. 23, 2013, for U.S. Appl. No. 12/769,956, 18 pages.
Reed et al., "Gas-Discharge Lamp Replacement With Passive Cooling," Amendment filed Apr. 11, 2014, for U.S. Appl. No. 12/769,956, 16 pages.
Reed et al., "Gas-Discharge Lamp Replacement With Passive Cooling," Office Action mailed May 9, 2014, for U.S. Appl. No. 12/769,956, 22 pages
Reed et al., "Gas-Discharge Lamp Replacement With Passive Cooling," Amendment filed Aug. 11, 2014, for U.S. Appl. No. 12/769,956, 15 pages.
Reed et al., "Gas-Discharge Lamp Replacement With Passive Cooling," Notice of Allowance mailed Aug. 29, 2014, for U.S. Appl. No. 12/769,956, 12 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Office Action mailed Apr. 21, 2015, for U.S. Appl. No. 13/875,130, 10 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.
Reed et al., "Turbulent Flow Cooling for Electronic Ballast," Office Action mailed Dec. 29, 2010, for U.S. Appl. No. 12/540,250, 16 pages.
Reed et al., "Turbulent Flow Cooling for Electronic Ballast," Amendment filed Apr. 29, 2011, for U.S. Appl. No. 12/540,250, 11 pages.
Reed et al., "Turbulent Flow Cooling for Electronic Ballast," Office Action mailed Jul. 20, 2011, for U.S. Appl. No. 12/540,250, 15 pages.
Reed et al., "Turbulent Flow Cooling for Electronic Ballast," Amendment filed Oct. 14, 2011, for U.S. Appl. No. 12/540,250, 12 pages.
Reed et al., "Turbulent Flow Cooling for Electronic Ballast," Office Action mailed Jan. 5, 2012, for U.S. Appl. No. 12/540,250, 12 pages.
Reed et al., "Turbulent Flow Cooling for Electronic Ballast," Amendment filed Apr. 5, 2012, for U.S. Appl. No. 12/540,250, 8 pages.
Reed et al., "Turbulent Flow Cooling for Electronic Ballast," Notice of Allowance mailed Aug. 15, 2012, for U.S. Appl. No. 12/540,250, 7 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Office Action mailed Apr. 23, 2014, for U.S. Appl. No. 13/085,301, 12 pages.

(56) References Cited

OTHER PUBLICATIONS

Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Asset Management System for Outdoor Luminaires," U.S. Appl. No. 14/869,501, filed Sep. 29, 2015, 57 pages.
Reed, "Detection and Correction of Faulty Photo Controls in Outdoor Luminaires," U.S. Appl. No. 14/869,492, filed Sep. 29, 2015, 71 pages.
Reed et al., "Luminaire With Adjustable Illumination Pattern," U.S. Appl. No. 14/939,856, filed Nov. 12, 2015, 69 pages.
Reed, "Luminaire With Ambient Sensing and Autonomous Control Capabilities," Office Action mailed Dec. 17, 2014, for U.S. Appl. No. 13/786,332, 20 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Office Action mailed May 29, 2015, for U.S. Appl. No. 13/786,332, 7 pages.
Reed, "Luminaire With Ambient Sensing and Autonomous Control Capabilities," Amendment filed Jul. 23, 2015, for U.S. Appl. No. 13/786,332, 17 pages.
Reed , "Luminaire With Ambient Sensing and Autonomous Control Capabilities," Notice of Allowance mailed Aug. 6, 2015, for U.S. Appl. No. 13/786,332, 9 pages.
Reed, "Luminaire With Ambient Sensing and Autonomous Control Capabilities," U.S. Appl. No. 14/950,823, filed Nov. 24, 2015, 72 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," Office Action mailed Apr. 29, 2013, for U.S. Appl. No. 13/166,626, 19 pages.
Renn et al., "Solid State Lighting Device and Method Employing Heat Exchanger Thermally Coupled Circuit Board," Amendment filed Sep. 24, 2013 for U.S. Appl. No. 13/166,626, 19 pages.
Renn et al., "Solid State Lighting Device and Method Employing Heat Exchanger Thermally Coupled Circuit Board," Office Action mailed Jan. 14, 2014, for U.S. Appl. No. 13/166,626, 19 pages.
Renn et al., "Solid State Lighting Device and Method Employing Heat Exchanger Thermally Coupled Circuit Board," Amendment filed Mar. 11, 2014, for U.S. Appl. No. 13/166,626, 24 pages.
Renn et al., "Solid State Lighting Device and Method Employing Heat Exchanger Thermally Coupled Circuit Board," Office Action mailed Oct. 2, 2014, for U.S. Appl. No. 13/166,626, 18 pages.
Renn et al., "Solid State Lighting Device and Method Employing Heat Exchanger Thermally Coupled Circuit Board," Amendment filed Dec. 29, 2014, for U.S. Appl. No. 13/166,626, 23 pages.
Renn et al., "Solid State Lighting Device and Method Employing Heat Exchanger Thermally Coupled Circuit Board," Office Action mailed Apr. 30, 2015, for U.S. Appl. No. 13/166,626, 17 pages.
Renn et al., "Solid State Lighting Device and Method Employing Heat Exchanger Thermally Coupled Circuit Board," Notice of Allowance mailed Sep. 10, 2015, for U.S. Appl. No. 13/166,626, 8 pages.
Tyco Electronics, "Circuit Protection," retrieved Jun. 10, 2011, retrieved from http://www.tycoelectronics.com/en/products/circuit-protection.html, 2 pages.
Written Opinion, mailed Jun. 10, 2009 for PCT/US2009/043170, 7 pages.
Written Opinion, mailed Nov. 29, 2010 for PCT/US2010/033000, 5 pages.
Written Opinion, mailed Dec. 15, 2010 for PCT/US2010/035658, 3 pages.
Written Opinion, mailed Sep. 29, 2011 for PCT/US2011/041402, 4 pages.
Written Opinion, mailed Oct. 8, 2012 for PCT/US2012/033059, 3 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion, mailed Dec. 30, 2014, for PCT/US2014/055909, 13 pages.
Extended European Search Report, dated May 3, 2016, for corresponding European Application No. 12771286.7, 9 pages.
International Preliminary Report on Patentability, issued Mar. 22, 2016, for International Application No. PCT/US2014/055909, 14 pages.
International Search Report and Written Opinion, mailed Feb. 29, 2015, for PCT/US2015/053000, 20 pages.
International Search Report and Written Opinion, mailed Feb. 29, 2015, for PCT/US2015/053006, 21 pages.
Reed, "Luminaire With Ambient Sensing and Autonomous Control Capabilities," Notice of Allowance mailed May 4, 2016, for U.S. Appl. No. 14/950,823, 10 pages.
Reed et al., "Apparatus and Method for Schedule Based Operation of a Luminaire," Amendment filed Jun. 7, 2016, for U.S. Appl. No. 14/552,274, 14 pages.
Reed, "Detection and Correction of Faulty Photo Controls in Outdoor Luminaires," Notice of Allowance mailed May 19, 2016 for U.S. Appl. No. 14/869,492, 9 pages.

\* cited by examiner

CENTRALIZED CONTROL OF AREA LIGHTING HOURS OF ILLUMINATION

BACKGROUND

Technical Field

The present disclosure relates to illumination, and more particularly to control of a plurality of illumination devices and systems.

Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

To simplify power distribution and control wiring, such luminaires may be organized into groups or similar hierarchical power and control structures. For example, multiple luminaires along a roadway may be grouped together on a common power circuit that is controlled using a single, centralized controller to collectively adjust the luminous output of all of the luminaires in the group. In another instance, multiple luminaires within a parking garage may be controlled using a single photocell mounted on the exterior of the parking garage. Such installations may however compromise operational flexibility for ease of installation and simplicity of operation.

Energy conservation has become of ever-increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

There appear to be at least two primary approaches to reducing energy consumption associated with lighting systems. One approach employs higher efficiency light sources. The other approach selectively provides light only when needed.

Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, fluorescent light sources may take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminated with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically through the use of one or more control mechanisms. Automatic control mechanisms generally fall into two broad categories, timers and environmental sensors. Timer-based control mechanisms turn light sources ON and OFF based on time. The times are typically user configurable and result in the luminaire turning ON for a period of time and then OFF for the remainder of a 24 hour period. Such timing circuits rely on the user to account for changes in length of daylight which may occur throughout a year by adjusting the ON period of the luminaire commensurate with the change in day length. Very often, timer-based control mechanisms are set once and never updated.

Automatic control devices such as photosensitive transducers (photosensors) and motion or proximity sensors add to the cost of a light fixture, and are frequently mounted in exposed positions where environmental or physical damage is unavoidable or vandalism may occur. In addition, a failure of the automatic control mechanism, for example failure of a photosensor used to turn the light source ON or OFF dependent upon the measured ambient light level, may result in the light source remaining in a continuously ON state in the event the automatic control mechanism fails in a "closed" position, permitting current flow to the light source, or in a continuously OFF state in the event the automatic control mechanism fails in an "open" position, interrupting current flow to the light source. Either failure mode results in an undesirable mode of operation of the light source.

Generally, a photocontrol is a device that switches or controls electrical loads based on ambient light levels. As an example, a photocontrol can be used as a switch that provides electrical power to a luminaire only when detected light levels are below a desired level. Photocontrols used for such luminaires may include photosensors that are electrically and operably coupled to switching devices rated for use at relatively high line voltages (e.g., 90 VAC to 600 VAC) and at relatively high currents (e.g., amperes and higher). For example, a photocontrol for a luminaire may include a photosensor that controls an electro-mechanical relay coupled between a source of electrical power and a control device (e.g., a magnetic or electronic transformer) within the luminaire. The electro-mechanical relay may be configured to be in an electrically continuous state unless a signal from the photosensor is present to supply power to the luminaire. If the photosensor is illuminated with a sufficient amount of light, the photosensor outputs the signal that causes the electro-mechanical relay to switch to an electrically discontinuous state such that no power is supplied to the luminaire.

A typical electro-mechanical relay used with a photocontrol for a luminaire has a relatively short life span. For example, electro-mechanical relays of conventional photocontrols used with luminaires may be rated to have only 5000 contactor closures with standard loads. Arcing caused by high capacitive in-rush currents of electronically ballasted luminaires and inductive "kick back" of magnetically ballasted luminaires can corrode the contactors of the electro-mechanical relays. Additionally, the contactors may include silver or other metal alloys upon which oxides and sulfides may form during normal operation. At line voltage and current, such oxides and sulfides may present a negligible resistance to the passage of current through the contactors. However, at relatively low voltages (e.g., 2V to 24V) and relatively low currents (e.g., microamps) such as those used for digital logic level signaling, the impedance presented by contaminants including oxide and sulfide accumulations can hinder or even prevent the transmission of current through the contactors. Thus, conventional photocontrols for luminaires can have especially short life spans when used in applications where the switching of relatively low voltage and relatively low current signals is required, for example, with luminaires that include solid-state light source drivers, for example, light emitting diode (LED) drivers that receive control signals for LED arrays.

BRIEF SUMMARY

A method of operation for a processor-based device to control a plurality of remotely located luminaires may be summarized as including: receiving, by at least one central control processor, illumination data relating to at least one of ambient illumination or time of day; generating, at the at least one central control processor, an illumination command based at least in part on the received illumination data; and distributing the illumination command through a power-line power distribution system.

The method may further include: receiving, at the plurality of luminaires, the illumination command through the power-line power distribution system; and controlling, at each of the plurality of luminaires, illumination of each respective luminaire based at least in part on the received illumination command. Controlling the illumination of each respective luminaire based at least in part on the received illumination command may include: controlling, at a first set of the plurality of luminaires, each respective luminaire in the first set to be in an illuminating state; and controlling, at a second set of the plurality of luminaires, each respective luminaire in the second set to be in a non-illuminating state. Receiving illumination data may include receiving photosensor data obtained from a photosensor operatively coupled to the at least one central control processor. Receiving illumination data may include receiving time data from a clock operatively coupled to the at least one central control processor. Generating an illumination command based at least in part on the received illumination data may include generating an illumination command that commands a first set of the plurality of luminaires to be in an illuminating state and commands a second set of the plurality of luminaires to be in a non-illuminating state. Generating an illumination command based at least in part on the received illumination data may include generating an illumination command that commands luminaires in the plurality of luminaires associated with a first set of logical addresses to be in an illuminating state and commands luminaires in the plurality of luminaires associated with a second set of logical addresses to be in a non-illuminating state. Generating an illumination command based at least in part on the received illumination data may include generating a set of illumination commands, each of the illumination commands in the set of illumination commands directed to luminaires associated with a unique set of logical addresses. The method may further include: generating a set of illumination commands based at least in part on the received illumination data, each one of the illumination commands in the set directed to a different subset of the plurality of luminaires; and sequentially distributing each of the illumination commands in the set of illumination commands through the power-line power distribution system. The method may further include: receiving, at the plurality of luminaires, the illumination commands in the set of illumination commands through the power-line power distribution system; and controlling, at each of the plurality of luminaires, the illumination of each respective luminaire based at least in part on the received illumination commands. The method may further include: partitioning the plurality of luminaires into at least two subsets based at least in part on a geographical location of each of the luminaires; and logically associating each luminaire with one of the at least two subsets in a nontransitory processor-readable storage medium; wherein generating an illumination command based at least in part on the received illumination data may include generating an illumination command directed to one of the subsets of luminaires in the at least two subsets. Distributing the illumination command through a power-line power distribution system may include superimposing the illumination command onto a power line of the power-line power distribution system. Receiving illumination data relating to at least one of ambient illumination or time of day may include receiving illumination data from an illumination data source positioned remote from at least some of the plurality of luminaires.

An illumination system may be summarized as including: at least one central control system comprising: at least one central control processor; at least one illumination data source operatively coupled to the at least one central control processor; a central transceiver operatively coupled to the at least one central control processor and a power-line power distribution system; and at least one nontransitory processor-readable storage medium operatively coupled to the at least one central control processor and storing at least one of data or instructions which, when executed by the at least one central control processor, cause the at least one central control processor to: receive illumination data from the at least one illumination data source relating to at least one of ambient illumination or time of day; generate an illumination command based at least in part on the received illumination data; and distribute the illumination command through the power-line power distribution system via the central transceiver.

The illumination system may further include: a plurality of luminaires, each of the luminaires including: at least one luminaire control processor; at least one light source operatively coupled to the luminaire control processor; a luminaire transceiver operatively coupled to the at least one luminaire control processor and the power-line power distribution system; and at least one nontransitory processor-readable storage medium operatively coupled to the at least one luminaire control processor and storing at least one of data or instructions which, when executed by the at least one luminaire control processor, cause the at least one luminaire control processor to: receive the illumination command through the power-line power distribution system via the luminaire transceiver; and control the operation of the at least one light source based at least in part on the received illumination command. In response to receipt of the illumination command from the at least one central control processor, the at least one luminaire control processor of each respective luminaire in a first set of luminaires may control the light source to be in an illuminating state, and the at least one luminaire control processor of each respective luminaire in a second set of luminaires may control the light source to be in a non-illuminating state. The illumination data source may include a photosensor operatively coupled to the central control processor, and the at least one central control processor may receive photosensor data from the photosensor. The illumination data source may include a clock operatively coupled to the central control processor, and the at least one central control processor may receive time data from the clock. The at least one central control processor may generate an illumination command that commands a first set of the plurality of luminaires to be in an illuminating state, and may command a second set of the plurality of luminaires to be in a non-illuminating state. The at least one central control processor may generate an illumination command that commands luminaires in the plurality of luminaires associated with a first set of logical addresses to be in an illuminating state, and may command luminaires in the plurality of luminaires associated with a second set of logical addresses to be in a non-illuminating state. The at least one central control processor may generate a set of illumination commands, each of the illumination commands in the set of illumination commands directed to luminaires associated with a unique set of logical addresses. The at least one central control processor may generate a set of illumination commands based at least in part on the received illumination data, each one of the illumination commands in the set directed to a different subset of the plurality of luminaires; and may sequentially distribute each of the illumination commands in the set of illumination commands through the power-line power distribution system. The at least one central control processor may partition the plurality of luminaires into at least two subsets based at least in part on a geographical location of each of the luminaires; and may logically associate each luminaire with one of the at least two subsets in the at least one nontransitory processor-readable storage medium; wherein the at least one central control processor may generate an illumination command directed to one of the subsets of luminaires in the at least two subsets. The at least one central transceiver may superimpose the illumination command onto a power line of the power-line power distribution system, and the luminaire transceiver of each luminaire may receive distributed power from the power line of the power-line power distribution system, and separate the illumination command from the distributed power. The illumination data source may be positioned remote from at least some of the plurality of luminaires.

A method of operation for a processor-based device to control a plurality of remotely located luminaires may be summarized as including: receiving, by at least one central control processor, illumination data relating to at least one of ambient illumination or time of day; generating, at the at least one central control processor, an illumination command based at least in part on the received illumination data; and distributing the illumination command through a power-line power distribution system to the plurality of luminaires; wherein each of the plurality of luminaires receives the illumination command through the power-line power distribution system and controls the operation of each respective luminaire based at least in part on the received illumination command.

An illumination system to control the operation of a plurality of luminaires may be summarized as including: at least one central control system comprising: at least one central control processor; at least one illumination data source operatively coupled to the at least one central control processor; a central transceiver operatively coupled to the at least one central control processor and a power-line power distribution system; and at least one nontransitory processor-readable storage medium operatively coupled to the at least one central control processor and storing at least one of data or instructions which, when executed by the at least one central control processor, cause the at least one central control processor to: receive illumination data from the at least one illumination data source relating to at least one of ambient illumination or time of day; generate an illumination command based at least in part on the received illumination data; and distribute the illumination command through the power-line power distribution system via the central transceiver to the plurality of luminaires, each of the plurality of luminaires receives the illumination command through the power-line power distribution system and controls the operation of each respective luminaire based at least in part on the received illumination command.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting," "luminous output" and "illumination" are used herein interchangeably. For instance, the phrases "level of illumination" or "level of light output" have the same meanings. In addition, for instance, the phrases "illumination source" and "light source" have the same meanings.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Systems, methods and articles of the present disclosure are directed to providing centralized control of area lighting hours of illumination.

Figure 1:
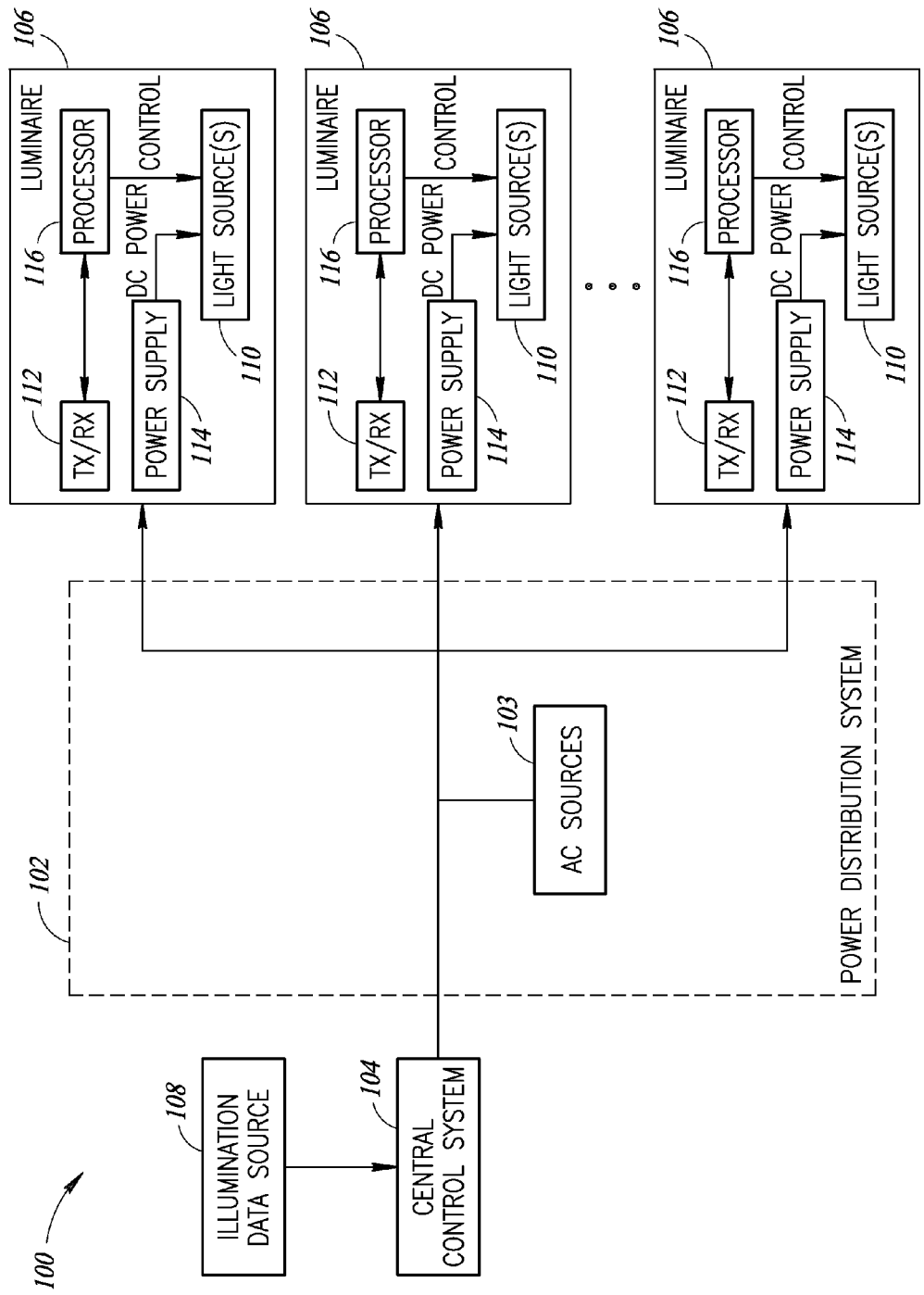
FIG. 1 is a schematic view of an environment in which an illumination system may be implemented, according to at least one illustrated embodiment.

FIG. 1 illustrates a schematic block diagram of an illumination system 100 that includes a power-line power distribution system 102, such as an alternating current (AC) network of a utility that includes one or more AC power sources 103, a central control system 104, and a plurality of luminaires 106. Three luminaires 106 are shown in FIG. 1 but it should be appreciated that the number of luminaires may vary depending on a particular application. For example, for applications wherein the central control system 104 controls luminaires 106 for a city, the number of luminaires may be in the hundreds or even thousands. Control output from the central control system 104 is coupled to the power distribution system 102 so as to supply control signals or commands to the plurality of luminaires 106 via power lines of the power distribution system.

The central control system 104 is operatively coupled to an illumination data source 108 that provides illumination data to the central control system through a suitable wired and/or wireless interface. In some implementations, the illumination data source 108 may include one or more photosensors operative to sense ambient light which may be used to detect one or more solar events (e.g., dawn event, dusk event). In some implementations, the illumination data source 108 may include one or more clocks or timers, and/or one or more look-up tables or other data structures that indicate dawn events and dusk events for one or more geographical locations at various times during a year. The time of occurrence of various solar events may additionally or alternatively be calculated using geolocation, time, or date data either generated by or stored within the central control system 104 or obtained from one or more external devices via one or more wired or wireless communication interfaces either in or communicably coupled to the central control system.

The central control system 104 receives illumination data from the illumination data source 108. Upon receipt of the illumination data, the central control system 104 may generate an illumination command.

The illumination command from the central control system 104 may be converted into power line control signals that may be superimposed onto wiring of the power distribution system 102 so that the control signals are transmitted or distributed to the luminaires 106 via the power distribution system. In some implementations, the power line control system signals may be in the form of amplitude modulation signals, frequency modulation signals, frequency shift keyed signals (FSK), differential frequency shift keyed signals (DFSK), differential phase shift keyed signals (DPSK), or other types of signals. The command code format of the control signals may be that of a commercially available controller format or may be that of a custom controller format. An example power line communication system is the TWACS® system available from Aclara Corporation, Hazelwood, Mo.

The central control system 104 may utilize a power line transceiver (see FIG. 2) that includes special coupling capacitors to connect transmitters to power-frequency AC conductors of the power distribution system 102. Signals may be impressed on one conductor, on two conductors or on all three conductors of a high-voltage AC transmission line. Filtering devices may be applied at substations of the power distribution system 102 to prevent the carrier frequency current from being bypassed through substation infrastructure. Power line carrier systems may be favored by utilities because they allow utilities to reliably move data over an infrastructure that they control.

In some instances, the power line control signals may be in the form of a broadcast signal or command delivered to each of the luminaires 106 in the illumination system 100. In some instances, the power line control signals may be specifically addressed to an individual luminaire 106, or to one or more groups or subsets of luminaires.

Referring to an exemplary luminaire 106 shown in FIG. 1, each luminaire includes one or more light sources 110, a power line transceiver 112, a power supply 114, and a luminaire processor 116. The power line transceiver 112 and the power supply 114 may each be electrically coupled with the power distribution system 102 to receive the power line control signal and a power signal, respectively, from the power distribution system. The power line transceiver 112 may separate or decode the power line control signals from the power signals and may provide the decoded signals to the luminaire processor 116. In turn, the luminaire processor 116 may generate one or more light source control commands that are supplied to the light sources 110 to control the operation thereof.

The power supply 114 may receive an AC power signal from the power distribution system 102, generate a DC power output, and supply the generated DC power output to the light sources 110 to power the light sources as controlled by the light source control commands from the luminaire processor 116.

The light sources 110 may include one or more of a variety of conventional light sources, for example incandescent lamps or fluorescent lamps such as high-intensity discharge (HID) lamps (e.g., mercury vapor lamps, high-pressure sodium lamps, metal halide lamps). The light sources 110 may also include one or more solid-state light sources (e.g., light emitting diodes (LEDs), organic LEDs (OLEDs), polymer LEDs (PLEDs)).

Figure 2:
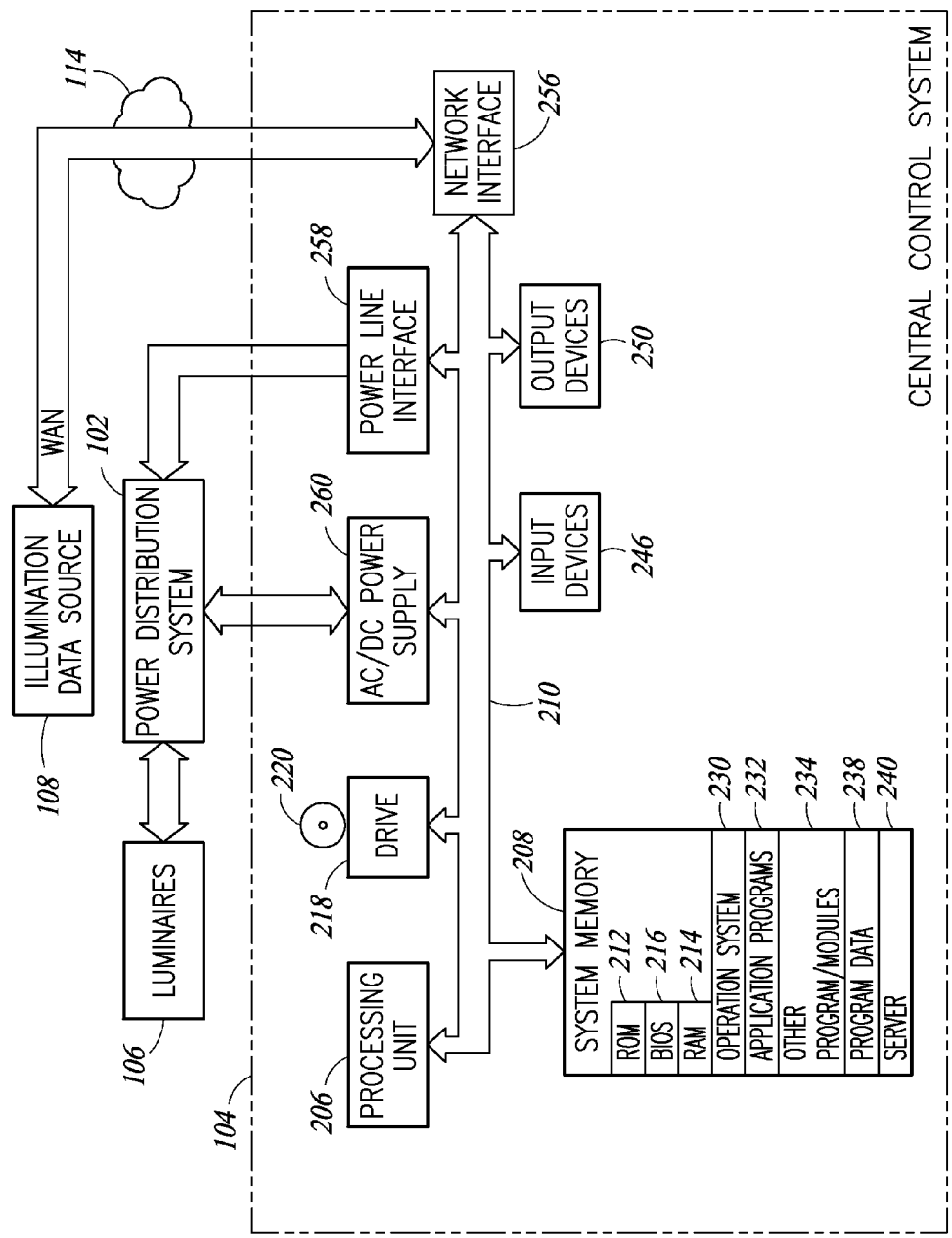
FIG. 2 is a functional block diagram of the illumination system of FIG. 1, according to at least one illustrated embodiment.

FIG. 2 and the following discussion provide a brief, general description of the components forming the illumination system 100 including the central control system 104, the power distribution system 102, the illumination data source 108, and the luminaires 106 in which the various illustrated embodiments can be implemented. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The central control system 104 may take the form of a PC, server, or other computing system executing logic or other machine executable instructions which may advantageously improve machine-readable symbol reading, allowing blurred and otherwise unreadable machine-readable symbols to be successfully read and decoded. The central control system 104 includes one or more processors 206, a system memory 208 and a system bus 210 that couples various system components including the system memory 208 to the processor 206. The central control system 104 will at times be referred to in the singular herein, but this is not intended to limit the embodiments to a single system, since in certain embodiments, there will be more than one central control system 104 or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The central control system 104 may be implemented as a supervisory control and data acquisition (SCADA) system or as one or more components thereof. Generally, a SCADA system is a system operating with coded signals over communication channels to provide control of remote equipment. The supervisory system may be combined with a data acquisition system by adding the use of coded signals over communication channels to acquire information about the status of the remote equipment for display or for recording functions.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the central control system 104, such as during start-up. Some embodiments may employ separate buses for data, instructions and power.

The central control system 104 also may include one or more drives 218 for reading from and writing to one or more nontransitory computer- or processor-readable media 220 (e.g., hard disk, magnetic disk, optical disk). The drive 218 may communicate with the processor 206 via the system bus 210. The drive 218 may include interfaces or controllers (not shown) coupled between such drives and the system bus 210, as is known by those skilled in the art. The drives 218 and their associated nontransitory computer- or processor-readable media 220 provide nonvolatile storage of computer-readable instructions, data structures, program modules and other data for the central control system 104. Those skilled in the relevant art will appreciate that other types of computer-readable media may be employed to store data accessible by a computer.

Program modules can be stored in the system memory 208, such as an operating system 230, one or more application programs 232, other programs or modules 234, and program data 238.

The application program(s) 232 may include logic capable of providing the luminaire control functionality described herein. For example, applications programs 232 may include programs for controlling luminaires 106 based at least in part on data received from the illumination data source 108.

The system memory 208 may include communications programs 240 that permit the central control system 104 to access and exchange data with other networked systems or components, such as the luminaires 106 and/or other computing devices.

While shown in FIG. 2 as being stored in the system memory 208, the operating system 230, application programs 232, other programs/modules 234, program data 238 and communications 240 can be stored on the nontransitory computer- or processor-readable media 220 or other non-transitory computer- or processor-readable media.

Personnel can enter commands (e.g., system maintenance, upgrades) and information (e.g., parameters) into the central control system 104 using one or more communicably coupled input devices 246 such as a touch screen or keyboard, a pointing device such as a mouse, and/or a push button. Other input devices can include a microphone, joystick, game pad, tablet, scanner, biometric scanning device, etc. These and other input devices may be connected to the processing unit 206 through an interface such as a universal serial bus ("USB") interface that couples to the system bus 210, although other interfaces such as a parallel port, a game port or a wireless interface or a serial port may be used. One or more output devices 250, such as a monitor or other display device, may be coupled to the system bus 210 via a video interface, such as a video adapter. In at least some instances, the input devices 246 and the output devices 250 may be located proximate the central control system 104, for example when the system is installed at the system user's premises. In other instances, the input devices 246 and the output devices 250 may be located remote from the central control system 104, for example when the system is installed on the premises of a service provider.

In some implementations, the central control system 104 uses one or more of the logical connections to optionally communicate with one or more remote computers, servers and/or other devices via one or more communications channels, for example, one or more networks 114. These logical connections may facilitate any known method of permitting computers to communicate, such as through one or more LANs and/or WANs. Such networking environments are known in wired and wireless enterprise-wide computer networks, intranets, extranets, and the Internet.

In some implementations, a network port or interface 256, communicatively linked to the system bus 210, may be used for establishing and maintaining communications over the communications network 114.

The central control system may include a power line interface 258 and an AC/DC power supply 260 that are each electrically coupled to the power distribution system 102. The AC/DC power supply 260 converts AC power from the power distribution system 102 into DC power, which may be provided to power the various components of the central control system 104. As discussed above, the power line interface 258 may be operative to superimpose control signals onto one or more conductors of the power distribution system 102 that carries power to the luminaires 106. The power line interface 258 may also be operative to decode and receive communication signals sent over the power distribution system 102 (e.g., from the power line interface 112 of a luminaire 106 (FIG. 1)).

In the illumination system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wireless. In some embodiments, program modules, application programs, or data, or portions thereof, can even be stored in other computer systems or other devices (not shown).

For convenience, the processor 206, system memory 208, network port 256 and devices 246, 250 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

It should be appreciated that the luminaires 106 may include components similar to those components present in the central control system 104, including the processor 206, power supply 260, power line interface 258, buses, nontransitory computer- or processor-readable media, wired or wireless communications interfaces, and one or more input and/or output devices.

Figure 3:
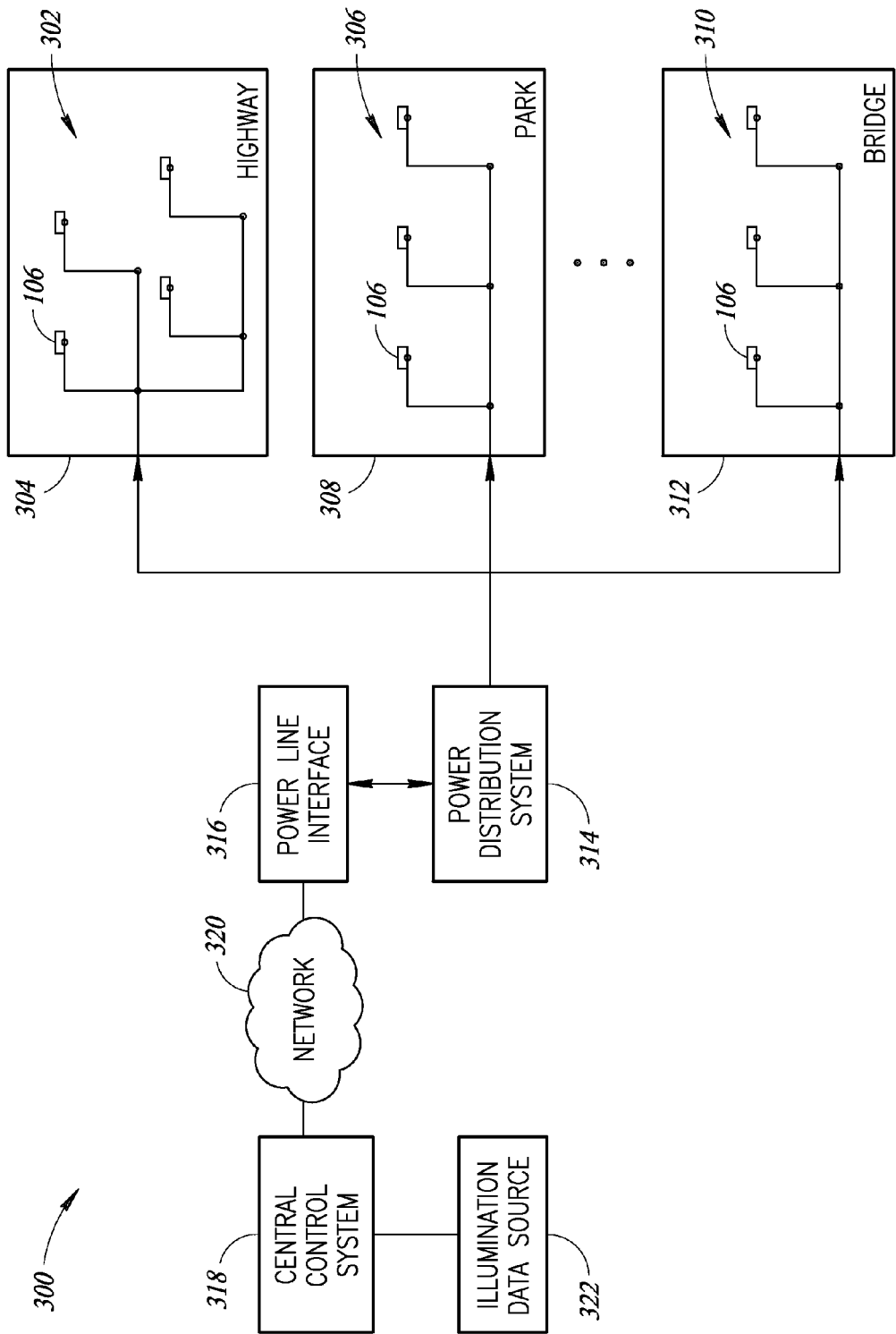
FIG. 3 is a schematic view of an environment in which an illumination system may be implemented, according to at least one illustrated embodiment.

FIG. 3 shows a schematic block diagram of an illumination system 300. The illumination system 300 includes a plurality of sets of luminaires 106 positioned at various geographical locations. In the illustrated simplified implementation, the illumination system 300 includes a set 302 of luminaires 106 positioned along a particular stretch of a highway 304, a set 306 of luminaires positioned at a park 308, and a set 310 of luminaires positioned on a bridge 312.

The luminaires 106 may be similar or identical to the luminaires described above and shown in FIGS. 1 and 2.

Each of the luminaires 106 is electrically coupled to a power distribution system 314, such as an AC power network provided by an electric utility. A power line interface 316 is operatively coupled to the power distribution system 314. In this implementation, a central control system 318 is operatively coupled to each of the luminaires 106 through a network 320 operatively coupled to the power line interface 316. The network 320 may include one or more wired or wireless networks such as the Internet, an extranet, an intranet, a LAN and/or a WAN.

The central control system 318 may also be operatively coupled to an illumination data source 322, such as a photosensor, one or more look-up tables, one or more clocks or timers, or other data structures that provide information useful to determining when to turn on and turn off the luminaires 106. In some implementations, the illumination data source 322 may be a plurality of illumination data sources. For example, a photosensor may be positioned at each of the highway 304, the park 308 and the bridge 312. In some implementations, the illumination data source 322 may be associated with one or more of the individual luminaires 106. For example, the illumination system 300 may include one photosensor that is a component of a luminaire 106 at the park 308, one photosensor that is a component of a luminaire on the highway 304, and one photosensor that is a component of a luminaire on the bridge 312. In these instances, the respective luminaires 106 including the photosensors may send illumination data to the central control system 318 via the power distribution system 314 so that the central control system can generate appropriate illumination control commands for all of the luminaires in the illumination system.

In some implementations, it may not be desirable to turn on or turn off all of the luminaires 106 in the area covered by the central control system 318 to minimize the power surge requirements of the electrical infrastructure. In these instances, the central control system 318 may generate illumination commands (e.g., "TURN ON LUMINAIRE") which may be sent to all the luminaires 106 but are executed by only a subset of the luminaires. For example, each luminaire 106 may have a logical address associated therewith which is used by the central control system 318 to direct a command to particular luminaires. Some commands issued from the central control system 318 may indicate that only luminaires with a particular subset of addresses must execute the command.

As a non-limiting example, the luminaires 106 may be provided with numerical addresses. The central control system 318 may issue a command directed to all luminaires 106 having numerical addresses with the last digit equal to 0 (i.e., luminaires with addresses ending in 0 would execute the command while luminaires with addresses ending in 1-9 would not execute the command). The central control system 318 may subsequently issue another command directed to all luminaires 106 having numerical addresses with the last digit equal to 1. This sequence of commands may continue until the central control system 318 issues a command directed to all luminaires 106 having numerical addresses with the last digit equal to 9 such that the luminaires in the illumination system 300 are divided into 10 groups or subsets. This process has the effect of reducing the power surge by 90% since only 10% of the luminaires 106 are turned on at a given time.

Figure 4:
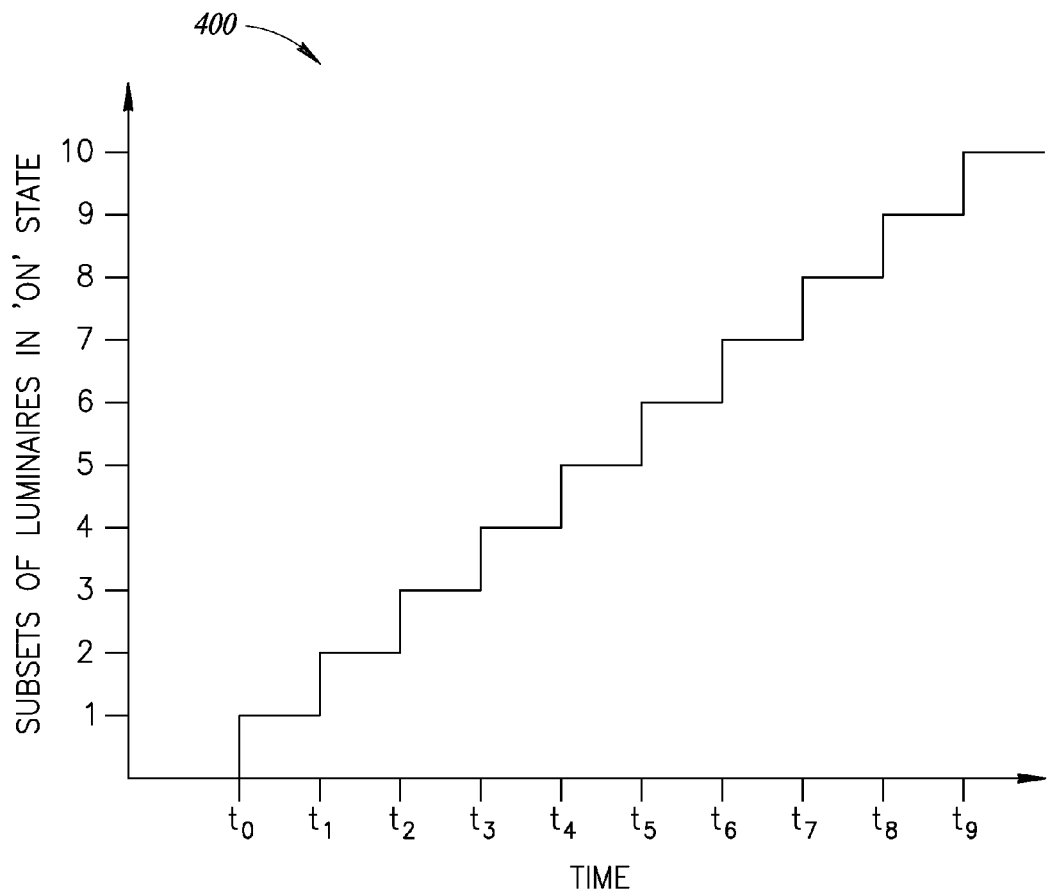
FIG. 4 is a graph that illustrates a sequential startup process for luminaires in an illumination system, according to at least one illustrated embodiment.

FIG. 4 is a graph 400 that illustrates the above example of the central control system 318 using sequential starting logic to turn on 10 sets of luminaires. At time $t_0$, the central control system 318 issues a first command to turn on the first set of luminaires. At time $t_1$, the central control system issues a second command to turn on the second set of luminaires. This sequential starting logic continues until the tenth set of luminaires is turned on at time $t_9$. By using this process, the power surge that would otherwise be caused by turning on luminaires simultaneously may be greatly reduced.

In some implementations, the subsets of the luminaires may be determined by geographical location. In the illustrated example of FIG. 3, the central control system 318 may generate a first command that turns on all of the luminaires 106 in the set 302 of luminaires on the highway 304, a subsequent second command that turns on all of the luminaires in the set 306 of luminaires in the park 308, and a subsequent third command that turns on all of the luminaires in the set 310 of luminaires on the bridge 312. By switching luminaires 106 located in the same geographical area at the same time, undesirable independent switching of luminaires within an area is prevented. For example, on a busy street where individual luminaires have individual photocontrols that have different sensitivities or different local ambient light levels, each luminaire along the street may be switched on or off independently, which could cause a distraction.

Figure 5:
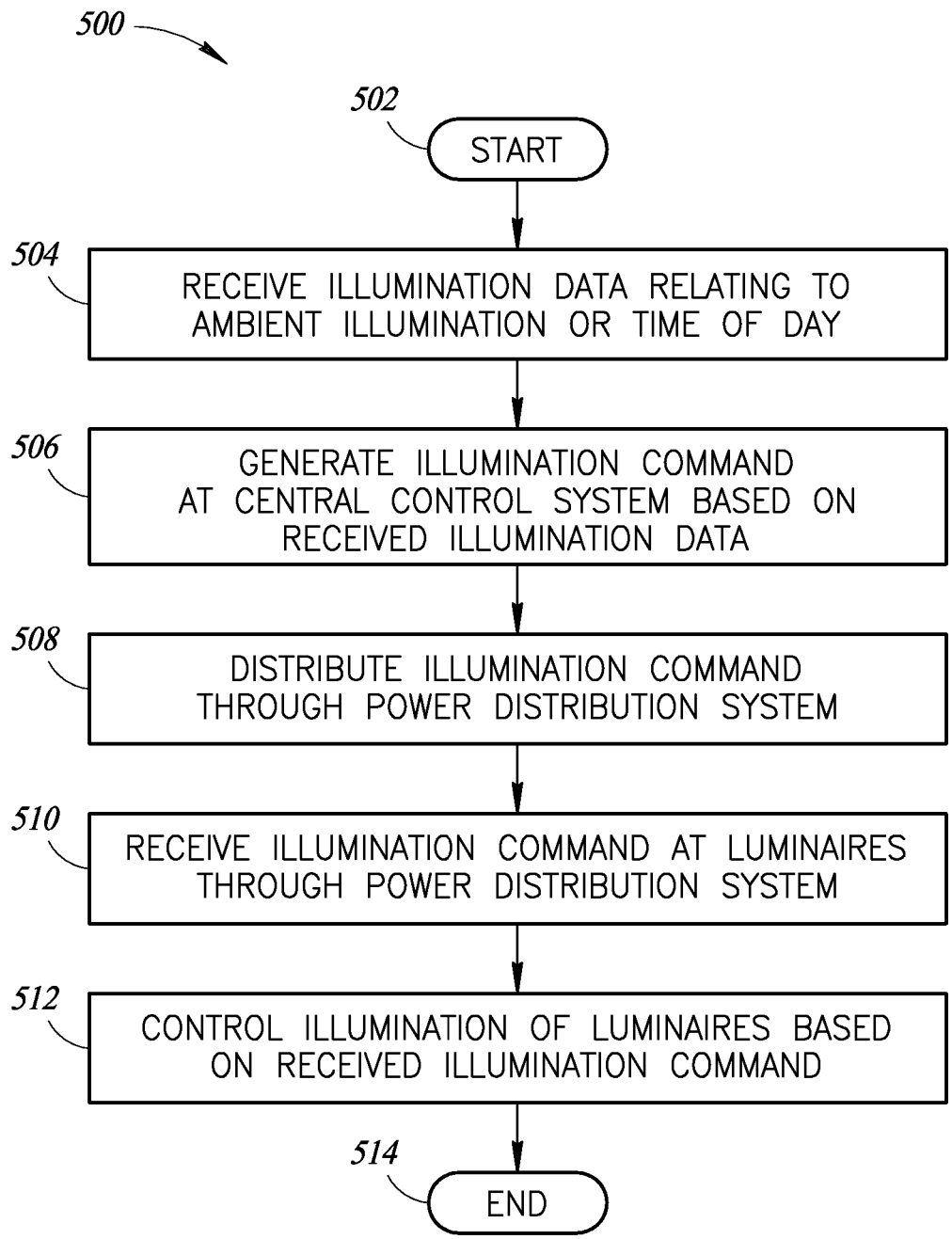
FIG. 5 is a flow diagram showing a method of operation of a processor-based device to control illumination of a plurality of luminaires in an illumination system, according to at least one illustrated embodiment.

FIG. 5 shows a method 500 of operating one or more processor-based devices to control the illumination of one or more geographical areas.

The method 500 starts at 502. For example, the method 500 may start in response to commissioning an illumination system, such as the illumination systems 100 and 300 shown in FIGS. 1 and 3, respectively.

At 504, the central control system may receive illumination data relating to ambient illumination or a time of day from an illumination data source. For example, the central control system may receive illumination data from a photosensor, or from a look-up table of dusk and dawn times.

At 506, the central control system generates an illumination command based on the received illumination data. As discussed above, the illumination command may be directed to all of the luminaires in the illumination system, or one or more subsets of luminaires in the system. Additionally, the central control system may generate a plurality illumination commands intended to be sequentially executed, for example, to sequentially turn on luminaires in the illumination system to reduce power surges.

At 508, the central control system causes the illumination command to be distributed through a power distribution system using power line communication. By using power line communication, the illumination system may use existing infrastructure without incurring the expense of adding additional wired or wireless communication channels.

At 510, each of the luminaires receives the illumination command through the power distribution system. As shown in FIG. 1, each of the luminaires may be equipped with a power line communications transceiver that facilitates reception of the illumination commands from the central control system over the power distribution system.

At 512, each of the luminaires controls the illumination of its respective light sources based at least in part on the illumination command received from the central control system. Each of the luminaires may control its respective light sources to be in the on state, off state, or a dimmed state. Further, as discussed above, each luminaire may determine whether the illumination command is directed to the luminaire based on addressing information in the command or other information specifying to which luminaires in the set of luminaires the command is directed.

The method 500 ends at 514 until started or invoked again. For example, the method 500 may be operated substantially continuously for an extended duration (e.g., years) so that the luminaires of the illumination system are continuously controlled through day and night for an extended period of time.

It should be appreciated that one advantage provided by the implementations of the present disclosure is that luminaires are improved because they do not need to have, but may have, working photocontrols installed locally. Another advantage is that the power surge that occurs when numerous luminaires are tuned on or off may be managed by the central control system to protect electrical infrastructure. Another advantage provided by the implementations of the present disclosure is that local areas of luminaires may be switched at the same time, thereby preventing independent switching of luminaires, as would be the case with luminaires using locally installed photocontrols that have different sensitivities or local ambient light levels. In the presently described systems and methods, all luminaires in a particular geographical area (e.g., a busy street) may be switched on or off simultaneously.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25, 2010; U.S. Pat. No. 8,378,563, issued Feb. 19, 2013; U.S. Provisional Patent Application Ser. No. 61/333,983, filed May 12, 2010; U.S. Pat. No. 8,541,950, issued Sep. 24, 2013; U.S. Provisional Patent Application Ser. No. 61/346,263, filed May 19, 2010, U.S. Pat. No. 8,508,137, issued Aug. 13, 2013; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Pat. No. 8,610,358, issued Dec. 17, 2013; U.S. Provisional Patent Application Ser. No. 61/527,029, filed Aug. 24, 2011; U.S. Pat. No. 8,629,621, issued Jan. 14, 2014; U.S. Provisional Patent Application Ser. No. 61/534,722, filed Sep. 14, 2011; U.S. Patent Publication No. 2013/0062637, published Mar. 14, 2013, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Patent Publication No. 2013/0229518, published Sep. 5, 2013; U.S. Provisional Patent Application Ser. No. 61/640,963, filed May 1, 2012; U.S. Provisional Patent Application No. 61/764,395 filed Feb. 13, 2013; U.S. Patent Publication No. 2013/0028198, published Jan. 30, 2014; U.S. Provisional Patent Application Ser. No. 61/692,619, filed Aug. 23, 2012; U.S. Provisional Patent Application Ser. No. 61/694,159, filed Aug. 28, 2012; U.S. Patent Publication No. 2014/0062341, published Mar. 6, 2014; U.S. Provisional Patent Application Ser. No. 61/723,675, filed Nov. 7, 2012; U.S. Patent Publication No. 2013/0141010, published Jun. 6, 2013; U.S. Provisional Patent Application Ser. No. 61/728,150, filed Nov. 19, 2012; U.S. Provisional Patent Application Ser. No. 61/764,395, filed Feb. 13, 2013; U.S. Patent Publication No. 2014/0062312, published Mar. 6, 2014, U.S. Patent Publication No. 2014/0139116, published May 22, 2014; U.S. Non-Provisional patent application Ser. No. 13/875,000 filed May 1, 2013; U.S. Provisional Patent Application No. 61/849,841 filed Jul. 24, 2013; U.S. Provisional patent application Ser. No. 13/973,696 filed Aug. 22, 2013; U.S. Provisional Patent Application No. 61/878,425 filed Sep. 16, 2013; U.S. Non-Provisional patent application Ser. No. 14/074,166 filed Nov. 7, 2013; U.S. Provisional Patent Application No. 61/905,699 filed Nov. 18, 2013; U.S. Non-Provisional patent application Ser. No. 14/158,630 filed Jan. 17, 2014; Provisional Patent Application No. 61/933,733 filed Jan. 30, 2014; and U.S. Non-Provisional patent application Ser. No. 14/179,737 filed on Feb. 14, 2014; U.S. Non-Provisional patent application Ser. No. 14/329,508 filed on Jul. 11, 2014; U.S. Non-Provisional patent application Ser. No. 14/488,069 filed On Sep. 16, 2014; U.S. Provisional Patent Application No. 62/068,517, filed Oct. 24, 2014; U.S. Provisional Patent Application No. 62/183,505, filed Jun. 23, 2015; U.S. Provisional Patent Application No. 62/082,463, filed Nov. 20, 2014; and U.S. Provisional Patent Application No. 62/057,419, filed Sep. 30, 2014; are incorporated herein by reference, in their entirety.

Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation for a processor-based device to control a plurality of remotely located luminaires, the method comprising:
   receiving, by at least one central control processor, illumination data relating to at least one of ambient illumination or time of day;
   generating, at the at least one central control processor, a set of illumination commands based at least in part on the received illumination data, each one of the illumination commands in the set directed to a different subset of a plurality of luminaires; and
   sequentially distributing each of the illumination commands in the set of illumination commands through a power-line power distribution system.

2. The method of claim 1, further comprising:
   receiving, at the plurality of luminaires, the illumination commands through the power-line power distribution system; and
   controlling, at each of the plurality of luminaires, illumination of each respective luminaire based at least in part on the received illumination commands.

3. The method of claim 2 wherein controlling the illumination of each respective luminaire based at least in part on the received illumination commands comprises:
   controlling, at a first subset of the plurality of luminaires, each respective luminaire in the first subset to be in an illuminating state; and
   controlling, at a second subset of the plurality of luminaires, each respective luminaire in the second subset to be in a non-illuminating state.

4. The method of claim 1 wherein receiving illumination data comprises receiving photosensor data obtained from a photosensor operatively coupled to the at least one central control processor.

5. The method of claim 1 wherein receiving illumination data comprises receiving time data from a clock operatively coupled to the at least one central control processor.

6. The method of claim 1 wherein generating a set of illumination commands based at least in part on the received illumination data comprises generating an illumination command that commands a first subset of the plurality of luminaires to be in an illuminating state and commands a second subset of the plurality of luminaires to be in a non-illuminating state.

7. The method of claim 1 wherein generating a set of illumination commands based at least in part on the received illumination data comprises generating an illumination command that commands luminaires in the plurality of luminaires associated with a first set of logical addresses to be in an illuminating state and commands luminaires in the plurality of luminaires associated with a second set of logical addresses to be in a non-illuminating state.

8. The method of claim 1 wherein generating a set of illumination commands based at least in part on the received illumination data comprises generating a set of illumination commands, each of the illumination commands in the set of illumination commands directed to luminaires associated with a unique set of logical addresses.

9. The method of claim 1, further comprising:
receiving, at the plurality of luminaires, the illumination commands in the set of illumination commands through the power-line power distribution system; and
controlling, at each of the plurality of luminaires, the illumination of each respective luminaire based at least in part on the received illumination commands.

10. The method of claim 1, further comprising:
partitioning the plurality of luminaires into at least two subsets based at least in part on a geographical location of each of the luminaires; and
logically associating each luminaire with one of the at least two subsets in a nontransitory processor-readable storage medium;
wherein generating a set of illumination commands based at least in part on the received illumination data comprises generating a first illumination command directed to one of the subsets of luminaires in the at least two subsets and a second illumination command directed to another of the subsets of luminaires in the at least two subsets.

11. The method of claim 1 wherein distributing each of the illumination commands in the set of illumination commands through a power-line power distribution system comprises superimposing each of the illumination commands in the set of illumination commands onto a power line of the power-line power distribution system.

12. The method of claim 1 wherein receiving illumination data relating to at least one of ambient illumination or time of day comprises receiving illumination data from an illumination data source positioned remote from at least some of the plurality of luminaires.

13. An illumination system, comprising:
at least one central control system comprising:
at least one central control processor;
at least one illumination data source operatively coupled to the at least one central control processor;
a central transceiver operatively coupled to the at least one central control processor and a power-line power distribution system; and
at least one nontransitory processor-readable storage medium operatively coupled to the at least one central control processor and storing at least one of data or instructions which, when executed by the at least one central control processor, cause the at least one central control processor to:
receive illumination data from the at least one illumination data source relating to at least one of ambient illumination or time of day;
generate a set of illumination commands based at least in part on the received illumination data, each one of the illumination commands in the set directed to a different subset of a plurality of luminaires; and
sequentially distribute each of the illumination commands in the set of illumination commands through the power-line power distribution system via the central transceiver.

14. The illumination system of claim 13, further comprising:
the plurality of luminaires, each of the luminaires comprising:
at least one luminaire control processor;
at least one light source operatively coupled to the luminaire control processor;
a luminaire transceiver operatively coupled to the at least one luminaire control processor and the power-line power distribution system; and
at least one nontransitory processor-readable storage medium operatively coupled to the at least one luminaire control processor and storing at least one of data or instructions which, when executed by the at least one luminaire control processor, cause the at least one luminaire control processor to:
receive an illumination command in the set of illumination commands through the power-line power distribution system via the luminaire transceiver; and
control the operation of the at least one light source based at least in part on the received illumination command.

15. The illumination system of claim 14 wherein, in response to receipt of the illumination command from the at least one central control processor, the at least one luminaire control processor of each respective luminaire in a first subset of luminaires controls the light source to be in an illuminating state, and the at least one luminaire control processor of each respective luminaire in a second subset of luminaires controls the light source to be in a non-illuminating state.

16. The illumination system of claim 13 wherein the illumination data source comprises a photosensor operatively coupled to the central control processor, and the at least one central control processor receives photosensor data from the photosensor.

17. The illumination system of claim 13 wherein the illumination data source comprises a clock operatively coupled to the central control processor, and the at least one central control processor receives time data from the clock.

18. The illumination system of claim 13 wherein the set of illumination commands commands a first subset of the plurality of luminaires to be in an illuminating state and commands a second subset of the plurality of luminaires to be in a non-illuminating state.

19. The illumination system of claim 13 wherein the set of illumination commands commands luminaires in the plurality of luminaires associated with a first set of logical addresses to be in an illuminating state and commands luminaires in the plurality of luminaires associated with a second set of logical addresses to be in a non-illuminating state.

20. The illumination system of claim 13 wherein each of the illumination commands in the set of illumination commands directed to luminaires associated with a unique set of logical addresses.

21. The illumination system of claim 13 wherein the at least one central control processor:
  partitions the plurality of luminaires into at least two subsets based at least in part on a geographical location of each of the luminaires; and
  logically associates each luminaire with one of the at least two subsets in the at least one nontransitory processor-readable storage medium;
  wherein a first illumination command in the set of illumination commands directed to one of the subsets of luminaires in the at least two subsets and a second illumination command in the set of illumination commands directed to another of the subsets of luminaires in the at least two subsets.

22. The illumination system of claim 13 wherein the at least one central transceiver superimposes the set of illumination commands onto a power line of the power-line power distribution system, and the luminaire transceiver of each luminaire receives distributed power from the power line of the power-line power distribution system, and separates at least one respective illumination command in the set of illumination commands from the distributed power.

23. The illumination system of claim 13 wherein the illumination data source is positioned remote from at least some of the plurality of luminaires.

24. A method of operation for a processor-based device to control a plurality of remotely located luminaires, the method comprising:
  receiving, by at least one central control processor, illumination data relating to at least one of ambient illumination or time of day;
  generating, at the at least one central control processor, a set of illumination commands based at least in part on the received illumination data, each one of the illumination commands in the set directed to a different subset of a plurality of luminaires; and
  sequentially distributing each of the illumination commands in the set of illumination commands through a power-line power distribution system to the plurality of luminaires;
  wherein each of the plurality of luminaires receives at least one respective illumination command in the set of illumination commands through the power-line power distribution system and controls the operation of each respective luminaire based at least in part on the at least one received respective illumination command.

25. An illumination system to control the operation of a plurality of luminaires, the illumination system comprising:
  at least one central control system comprising:
    at least one central control processor;
    at least one illumination data source operatively coupled to the at least one central control processor;
    a central transceiver operatively coupled to the at least one central control processor and a power-line power distribution system; and
    at least one nontransitory processor-readable storage medium operatively coupled to the at least one central control processor and storing at least one of data or instructions which, when executed by the at least one central control processor, cause the at least one central control processor to:
      receive illumination data from the at least one illumination data source relating to at least one of ambient illumination or time of day;
      generate a set of illumination commands based at least in part on the received illumination data, each one of the illumination commands in the set directed to a different subset of a plurality of luminaires; and
      sequentially distribute each of the illumination commands in the set of illumination commands through the power-line power distribution system via the central transceiver to the plurality of luminaires, each of the plurality of luminaires receives at least one respective illumination command in the set of illumination commands through the power-line power distribution system and controls the operation of each respective luminaire based at least in part on the at least one received respective illumination command.

26. The method of claim 24 wherein distributing each of the illumination commands in the set of illumination commands through a power-line power distribution system comprises superimposing each of the illumination commands in the set of illumination commands onto a power line of the power-line power distribution system.

27. The illumination system of claim 25 wherein the at least one central transceiver superimposes the set of illumination commands onto a power line of the power-line power distribution system, and each of the plurality of luminaires receives distributed power from the power line of the power-line power distribution system.

* * * * *